(12) United States Patent  (10) Patent No.: US 7,648,776 B2
Vieregge et al.                (45) Date of Patent:   Jan. 19, 2010

(54) MULTI-LAYERED BRAZING SHEET

(75) Inventors: Klaus Vieregge, Nauort (DE); Sampath Desikan, Koblenz (DE); Adrianus Jacobus Wittebrood, Velserbroek (NL); Mark Henrik Röger, Koblenz (DE); Job Anthonius Van Der Hoeven, Haarlem (NL); Andreas Eilemann, Erdmannhausen (DE); Matthias Gördeler, Stuttgart (DE); Matthias Traub, Korntal-Münchingen (DE); Matthias Türpe, Marbach a. N. (DE); Bernd Grünenwald, Nürtingen (DE)

(73) Assignees: Behr GmbH & Co. KG, Stuttgart (DE); Aleris Aluminum Koblenz GmbH, Koblenz (DE)

( * ) Notice: Subject to any disclaimer, the term of this patent is extended or adjusted under 35 U.S.C. 154(b) by 219 days.

(21) Appl. No.: 11/549,054

(22) Filed: Oct. 12, 2006

(65) Prior Publication Data

US 2007/0122648 A1    May 31, 2007

(30) Foreign Application Priority Data

Oct. 13, 2005  (EP)  .................................. 05077343

(51) Int. Cl.
  *B32B 15/20*   (2006.01)
  *B32B 15/01*   (2006.01)
  *B23K 103/10*  (2006.01)
(52) U.S. Cl. ................... 428/654; 428/650; 228/262.51
(58) Field of Classification Search ........................ None
  See application file for complete search history.

(56) References Cited

U.S. PATENT DOCUMENTS 6,911,267 B1   6/2005   Goodrich et al.
7,255,932 B1 *  8/2007   Kilmer ....................... 428/654

(Continued)

FOREIGN PATENT DOCUMENTS

EP    1351795    10/2003

(Continued)

OTHER PUBLICATIONS

"International Alloy Designations and Chemical Composition Limits for Wrought Aluminum and Wrought Aluminum Alloys"—Registration Record Series Teal Sheets, The Aluminum Association, Inc. Apr. 2006, pp. 1-12.

(Continued)

*Primary Examiner*—Jennifer McNeil
*Assistant Examiner*—Jason L Savage
(74) *Attorney, Agent, or Firm*—Novak Druce + Quigg LLP

(57) ABSTRACT

A multi-layered brazing sheet with improved long life corrosion resistance achieved by balancing the Zn, Cu, Mn, Si and Mg content of the core and interliner alloy. The brazing sheet has a core of a 3xxx alloy, an inner braze cladding of a 4xxx alloy, and between core and inner braze cladding an interliner of a 3xxx alloy. The 3xxx alloy of the core has 0.55-1.0 wt % Cu, 0.7-1.8 wt % Mn, <0.3 wt % Mg, <0.4 wt % Zn. The 3xxx alloy of the interliner has <0.25 wt % Cu, 0.5-1.5 wt % Mn, <0.3 wt % Mg, 0.1-5.0 wt % Zn. A 1xxx or 7xxx alloy could be used for the interliner instead of the 3xxx alloy.

29 Claims, 2 Drawing Sheets

U.S. PATENT DOCUMENTS

| | | | |
|---|---|---|---|
| 7,374,827 B2 * | 5/2008 | Kilmer | 428/654 |
| 2002/0142185 A1 * | 10/2002 | Kilmer | 428/654 |
| 2004/0038071 A1 | 2/2004 | Yoshidomi | |
| 2006/0196645 A1 | 9/2006 | Leroy et al. | |

FOREIGN PATENT DOCUMENTS

| | | | |
|---|---|---|---|
| EP | 1391679 | | 2/2004 |
| JP | 07-179971 | * | 7/1995 |
| JP | 08-134574 | * | 5/1996 |
| JP | 09-176767 | * | 7/1997 |
| JP | 11293372 | | 10/1999 |
| JP | 2002-028800 | * | 1/2002 |
| JP | 2002-030367 | * | 1/2002 |
| WO | 02055256 | | 7/2002 |

OTHER PUBLICATIONS

Observation filed Aug. 19, 2009 by third party under Article 115 EPC.

* cited by examiner

MULTI-LAYERED BRAZING SHEET

CROSS REFERENCE TO RELATED APPLICATION

This claims priority from European patent application No. EP 05077343.1, filed 13 Oct. 2005, incorporated herein by reference in its entirety.

FIELD OF THE INVENTION

The invention relates to an aluminium brazing sheet to be used in heat exchanger systems, such as for instance heat exchangers for automotive purposes. Ideally the brazing sheet is used for manufacturing tubes of such a heat exchanger.

BACKGROUND OF THE INVENTION

The known brazing sheets to be used in heat exchanger systems usually are a three layer system comprising an outer 4xxx alloy clad, a 3xxx core alloy and a 7xxx or 1xxx innerliner alloy. In this specific use the inside wall of the successive parts of the heat exchanger is in direct contact with the cooling fluid and, because of the temperature of the fluid and the flow conditions, a high corrosion resistance is required. It is well known to use a Zn containing innerliner to improve the corrosion resistance of these brazing sheets. Common innerliners are made of for example a 7072 alloy or a 3003 alloy with Zn. The Zn containing innerliners act as sacrificial anodes, forcing the corrosion to attack the inner surface of the heat exchanger in a lateral way instead of penetrating the layer by localized pitting or intergranular corrosion.

As will be appreciated, alloy designations and temper designations, except otherwise indicated, refer to the Aluminum Association designations in Aluminum Standards and Data and the Registration Records, all published by the US Aluminum Association.

All percentages are in weight percent, unless otherwise indicated.

The brazing sheet disclosed in EP-1351795 (published as WO 02/055256) has an inner liner with 1.3-1.5 wt % Zn and, among other elements<0.4 wt % Si and 0.05-0.4 wt % Cu. Also in WO 02/055256, a 2 or 3 layer sheet is disclosed with a core of a 3xxx alloy and an innerliner with, among other elements, 0.7-3.0 wt % Zn.

In JP-11293372 high corrosion resistance is disclosed for a system with a 2 or 3 layer system with a core consisting of among other elements, 0.3-1.1 wt % Si, clad on one or both sides with sacrificial anode material consisting of, among other elements, 1.5-8 wt % Zn with Fe and Si compounds regulated.

From EP-1391679 a sacrificial waterside liner to be used in a heat exchanger is known with 1.0-10.0 wt % Zn and, among other elements, 0.4-3.0 wt % Ni.

SUMMARY OF THE INVENTION

An object of the invention is to provide an aluminium multi-layered brazing sheet product to be used in heat exchanger applications with an improved long life corrosion resistance with respect to the known multi-layer systems.

This object is achieved by having an interliner provide effective sacrificial protection of the core by carefully balancing the content of alloying elements in the interliner and core, which influence the corrosion potential, taking into account diffusion during processing and brazing of the sheet. The more important alloying elements to control are Zn and Cu and to a lesser extent Si, Mn and Mg.

Accordingly, a multilayered brazing sheet is provided comprising:
a core of a 3xxx alloy
an inner braze cladding of a 4xxx alloy, and
between core and inner braze cladding an interliner of a 3xxx, 1xxx or 7xxx alloy, and wherein the 3xxx alloy of the core comprises:
0.55-1.0 wt % Cu
0.65-1.8 wt % Mn
<0.3 wt % Mg
<0.4 wt % Zn
<1.0 wt % Si
<0.7 wt % Fe
and optionally one or more of
<0.3 wt % Cr
<0.2 wt % Ti, and one or more of V, Zr, In, Sc, Sn, each in a range of up to 0.5%, balance aluminium and unavoidable impurities, and wherein the 3xxx, 1xxx or 7xxx alloy of the interliner comprises:
0.1-5.0 wt % Zn.

With the above composition the required electrochemical potential profile for sacrificial protection is provided for with the core having the highest corrosion potential. According to tests a difference in corrosion potential between interliner and core after brazing should be at least 20 mV and preferably 30 mV.

DETAILED DESCRIPTION OF THE PREFERRED EMBODIMENTS

Figure 1:
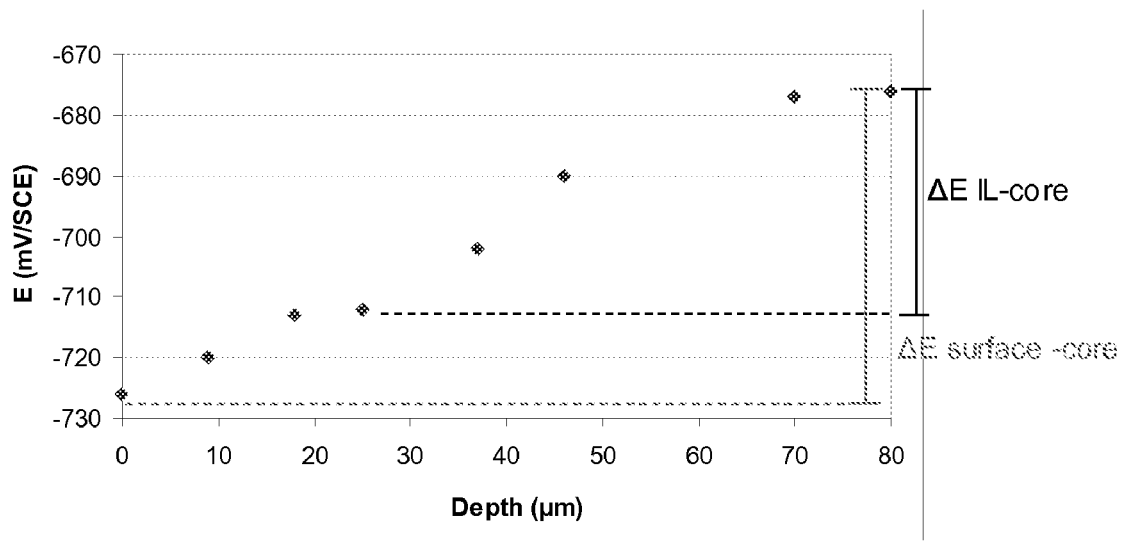
FIG. 1 shows corrosion potential profile for the material given in example 1.

The present invention provides an interliner to provide effective sacrificial protection of the core by carefully balancing the content of alloying elements in the interliner and core, that influence the corrosion potential, taking into account diffusion during processing and brazing of the sheet. The more important alloying elements to control are Zn and Cu and to a lesser extent Si, Mn and Mg.

Accordingly, a multilayered brazing sheet is provided comprising:
a core of a 3xxx alloy
an inner braze cladding of a 4xxx alloy, and
between core and inner braze cladding an interliner of a 3xxx, 1xxx or 7xxx alloy, and wherein the 3xxx alloy of the core comprises:
0.55-1.0 wt % Cu
0.65-1.8 wt % Mn
<0.3 wt % Mg
<0.4 wt % Zn
<1.0 wt % Si
<0.7 wt % Fe
and optionally one or more of
<0.3 wt % Cr
<0.2 wt % Ti, and one or more of V, Zr, In, Sc, Sn, each in a range of up to 0.5%, balance aluminium and unavoidable impurities, and wherein the 3xxx, 1xxx or 7xxx alloy of the interliner comprises:

0.1-5.0 wt % Zn.

With the above composition the required electrochemical potential profile for sacrificial protection is provided for with the core having the highest corrosion potential. According to tests, a difference in corrosion potential between interliner and core after brazing should be at least 20 mV and preferably 30 mV.

After brazing, the braze liner will be almost disappeared because it flows away. However, during the processing of the material, and the heat up phase of the brazing cycle, a diffusion layer between braze liner and inter liner will have been formed. The additional difference in corrosion potential, caused by the presence of this diffusion layer on top of the inter liner is used to enhance the sacrificial protection. So the inner braze cladding not only has the advantage to be able to braze the brazing sheet product on the inside, but it also provides a significant contribution to the sacrificial protection.

According to a preferred embodiment the 3xxx alloy of the interliner further comprises:

<0.25 wt % Cu
0.5-1.5 wt % Mn
<0.3 wt % Mg
<1.0 wt % Si
<0.7 wt % Fe balance aluminium and unavoidable impurities.

According to a preferred embodiment the 3xxx alloy of the core preferably comprises <0.5 wt % Fe in order to have good formability of the alloy.

According to a preferred embodiment the 3xxx alloy of the core preferably comprises 0.55-0.8 wt % Cu. By adding Cu to the core, the corrosion potential is increased, as far as the Cu stays in solid solution. To get the required relatively high corrosion potential of the core a minimum Cu level of 0.55% is necessary. Above 1% Cu the solidus temperature of the core becomes too close to the brazing temperature which would make the alloy no longer suitable for brazing. The preferred upper limit for Cu is 0.8% to avoid a relatively high Cu content in the interliner due to diffusion from the core into the interliner.

According to a preferred embodiment the 3xxx alloy of the core preferably comprises 0.65-1.5 wt % Mn and more preferably 0.65-1.2 wt % Mn. Below 0.65% Mn the strength of the alloy is too low, above 1.5% Mn the danger for coarse intermetallics, that can be formed during casting, increases considerably. In combination with the presence of up to 0.7% Fe, the preferred upper limit is 1.2% Mn to be on the safe side for casting problems due to coarse intermetallics.

According to a preferred embodiment the 3xxx alloy of the core preferably comprises <0.1 wt % Mg, more preferably <0.05%. Mg increases the strength of the alloy significantly, but in Controlled Atmosphere Brazing, the presence of Mg can poison the flux. Mg can relatively easy diffuse from the core into the cladding.

According to a preferred embodiment the 3xxx alloy of the core preferably comprises <0.15 wt % Cr. Cr in a range up to 0.3% can be added to the alloy to improve the strength in the post braze condition. However to avoid problems with intermetallics during casting, the preferred upper limit is 0.15%.

According to a preferred embodiment the 3xxx alloy of the interliner preferably comprises <0.7 wt % Si and more preferably 0.4 wt % Si. The maximum level of Si is 1% to avoid a low solidus temperature. However, in combination with the other elements that can also reduce the solidus temperature, the preferred Si level is kept lower.

According to a preferred embodiment the 3xxx alloy of the interliner preferably comprises <0.5 wt % Fe. The same reasons apply as given for Fe content in the core alloy.

According to a preferred embodiment the 3xxx alloy of the interliner preferably comprises <0.2 wt % Cu. This is an important alloying element according to the invention, but in the interliner the level of Cu should be limited because it will increase the corrosion potential. Since the interliner should have a relatively low corrosion potential, the level of Cu is preferably limited to <0.2%.

According to a preferred embodiment the 3xxx alloy of the interliner preferably comprises 0.5-1.0 wt % Mn. In order to keep the right balance in corrosion potential between core and interliner, it is preferred to have less Mn in the interliner than in the core. Therefore, the Mn range in the interliner is preferably 0.5-1.0%.

According to a preferred embodiment the 3xxx alloy of the interliner preferably comprises <0.1 wt % Mg. The same reasons apply as given for the Mg content in the core alloy.

According to a preferred embodiment the 3xxx alloy of the interliner preferably comprises 0.5-3.0 wt % Zn. This is an important alloying element according to the invention. By adding Zn to the interliner, the corrosion potential can be decreased. To get the required relatively low corrosion potential of the interliner a minimum Zn level of 0.1% is necessary. Above 5% Zn the difference in corrosion potential between core and interliner becomes too high, resulting in rapid self corrosion of the system. For the right balance between core and interliner the preferred Zn range is 0.5-3.0%.

Instead of using a 3xxx alloy for the interliner it is, according to a further embodiment, also possible to use a 1xxx alloy with a Zn content in the range of 0.1-5.0 wt %.

The brazing sheet preferably has on the opposite side of the core an outer braze cladding such that the multi layered brazing sheet product consists of a four layered system. The inner braze cladding as well as the outer braze cladding are preferably made of a 4xxx alloy with <15 wt % Si, preferably 4-15 wt % and more preferable 7-12 wt % Si and Cu<0.3 wt %. Any braze cladding which melts just below the brazing temperature will be suited, as long as it does not interfere with the corrosion potential balance. To avoid any interference with the corrosion potential balance, the braze cladding should not contain more than 0.3% Cu, or more than 0.2% Zn. Well known braze alloys like AA4045 and AA4343 are suited.

The brazing sheet may comprise 3, 4 or 5 layers, the three layered sheet having a core, interliner and braze cladding at the inner side; the four layered sheet having an outer braze cladding and the five layered sheet having also an interliner between the core and the outer braze cladding. With the inner braze cladding it becomes also possible to braze the brazing sheet product on the inside. For example dividing a tube in two tubes by bringing opposite parts of the inner side of the tube against each other and connect these parts by brazing, the so called B-type tubes.

The successive layers of the multi-layer brazing sheet preferably have a thickness ratio in respect to the total thickness of the multi-layered brazing sheet of:

| | |
|---|---|
| outer cladding | 5-15% |
| core | 60-85% |
| interliner | 5-30% |
| innerside cladding | 5-15%. |

Furthermore, the invention also includes a brazed assembly comprising one or more tubes made from the multi-layered brazing sheet product.

EXAMPLES

Example 1

The following 4-layer brazing sheet was produced:
Braze cladding: 10% of thickness.
Standard 4343 (with 0.25% Fe and 0.015% Cu)
Core: 70% of thickness
Nominal chemistry:
Si: 0.15%
Fe: 0.35%
Cu: 0.65%
Mn: 0.95%
Mg: 0.01%
Cr: 0.03%
Zn: 0.02%
Ti: 0.09%
Zr: 0.03%
Interliner: 15% of thickness
Nominal chemistry:
Si: 0.15%
Fe: 0.25%
Cu: 0.02%
Mn: 0.90%
Mg: 0.01%
Zn: 1.2%
Ti: 0.03%
Braze cladding: 5% of thickness.
Standard 4343 (with 0.25% Fe and 0.015% Cu)

The different layers were combined by roll bonding, in the same way as a standard 3-layer brazing material is produced. It was rolled down to a final thickness of 0.260 mm. Next, the material was given a brazing simulation: heated up at 25° C./min to 600° C., held for 6 minutes and cooled down at 25° C./min. The sample was hanging, so the molten braze cladding layers flowed to the bottom of the sample, leaving only a thin layer of residual cladding at the surface of the sample.

The corrosion potential profile was measured up to a depth of 0.08 mm.

The result is shown in FIG. 1. It can be concluded that for this sample the difference in corrosion potential between core and interliner is about 42 mV, and between core and surface about 50 mV. These differences in corrosion potential are highlighted in FIG. 2.

Example 2

Three 4-layer brazing sheet materials were produced. The nominal chemistries of the alloys used for these materials were identical, except for the Zn level in the interliner. The nominal Zn level in the interliner was 1.2%, 2.5% and 4.5% respectively.

All three materials have an AA4343 (with 0.25% Fe and 0.015% Cu) braze cladding of 10% of the thickness, on one side of the core. On the other side is an interliner, 15% of the thickness, followed by an AA4343 (with 0.25% Fe and 0.015% Cu) braze cladding, 5% of the thickness.

The different layers were combined by roll bonding, in the same way as a standard 3-layer brazing material is produced. All three materials were rolled down to a final thickness of 0.260 mm. Next, the materials were given a brazing simulation: heated up at 25° C./min to 600° C., held for 6 minutes and cooled down at 25° C./min. The samples were hanging, so the molten braze cladding layers flowed to the bottom of the sample, leaving only a thin layer of residual cladding at the surface of the sample.

1) Material with Nominal 1.2% Zn in the Interliner
   See example 1.

2) Material with Nominal 2.5% Zn in the Interliner
   Core: 70% of thickness
   Actual chemistry of this material is identical to the material with 1.2% Zn in the interliner, as material from the same cast was used:
   Si: 0.17%
   Fe: 0.30%
   Cu: 0.65%
   Mn: 0.88%
   Mg: 0.006%
   Cr: 0.03%
   Zn: 0.01%
   Ti: 0.095%
   Zr: 0.03%
   Interliner: 15% of thickness
   Actual chemistry:
   Si: 0.04%
   Fe: 0.14%
   Cu: 0.00%
   Mn: 0.8%
   Mg: 0.00%
   Zn: 2.61%
   Ti: 0.03%

The corrosion potential profile was measured up to a depth of 0.08 mm (80 μm).

Figure 2:
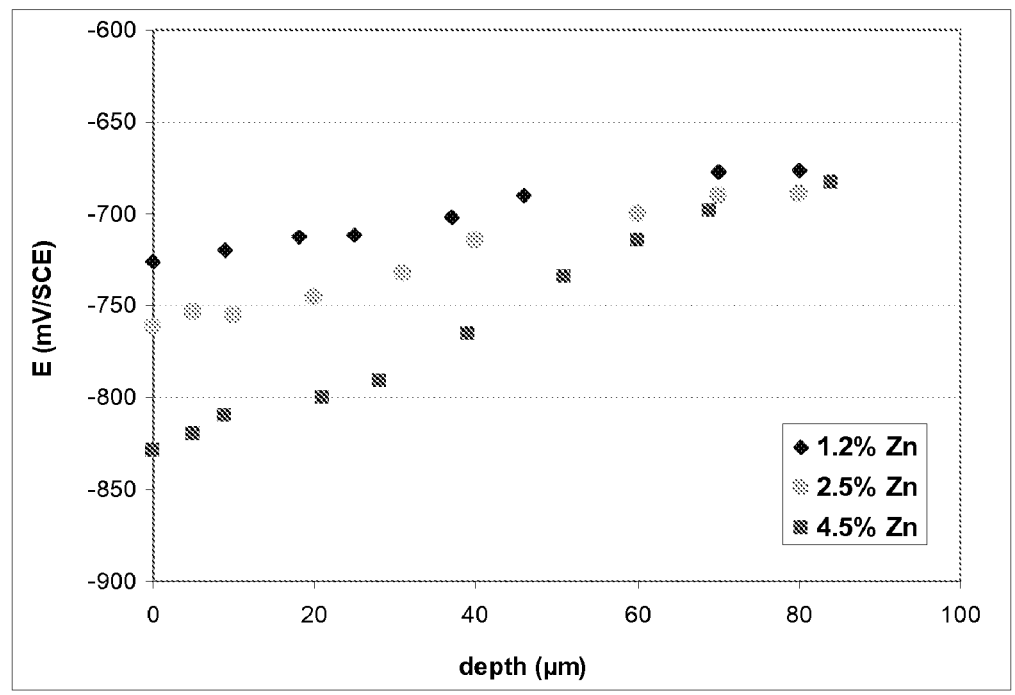
FIG. 2 shows corrosion potential profile for the materials given in example 2.

The result is shown in FIG. 2. It can be concluded for this example that the difference in corrosion potential between core and interliner is about 60 mV, and between core and surface about 70 mV.

3) Material with Nominal 4.5% Zn in the Interliner
   Core: 70% of thickness
   Actual chemistry:
   Si: 0.10%
   Fe: 0.28%
   Cu: 0.62%
   Mn: 0.89%
   Mg: 0.006%
   Cr: 0.03%
   Zn: 0.01%
   Ti: 0.098%
   Zr: 0.02%
   Interliner: 15% of thickness
   Actual chemistry:
   Si: 0.04%
   Fe: 0.18%
   Cu: 0.00%
   Mn: 0.85%
   Mg: 0.01%
   Zn: 4.43%
   Ti: 0.03%

The corrosion potential profile was measured up to a depth of 0.08 mm (80 μm). The result is also shown in FIG. 2. It can be concluded for this example that the difference in corrosion potential between core and interliner is about 115 mV, and between core and surface about 145 mV.

The results in FIG. 2 show the effect of an increasing amount of Zn in the interliner.

Example 3

Another 4-layer brazing sheet material was produced, with nominal Zn level in the interliner 4.5%.

The chemistry of the core and interliner used for this new material is identical to the one used in Example 2 (third material), as materials from the same casts were used.

The difference with the material from Example 2 is the thickness of the interliner, which is 20% of the thickness for the current material.

The material has an AA4343 (with 0.25% Fe and 0.015% Cu) braze cladding of 10% of the thickness, on one side of the core. On the other side is an interliner, 20% of the thickness, followed by an AA4343 (with 0.25% Fe and 0.015% Cu) braze cladding, 5% of the thickness.

The different layers were combined by roll bonding, in the same way as a standard 3-layer brazing material is produced. The material was rolled down to a final thickness of 0.260 mm. heated up at 25° C./min to 600° C., held for 6 minutes and cooled down at 25° C./min. The sample was hanging, so the molten braze cladding layers flowed to the bottom of the sample, leaving only a thin layer of residual cladding at the surface of the sample.

Figure 3:
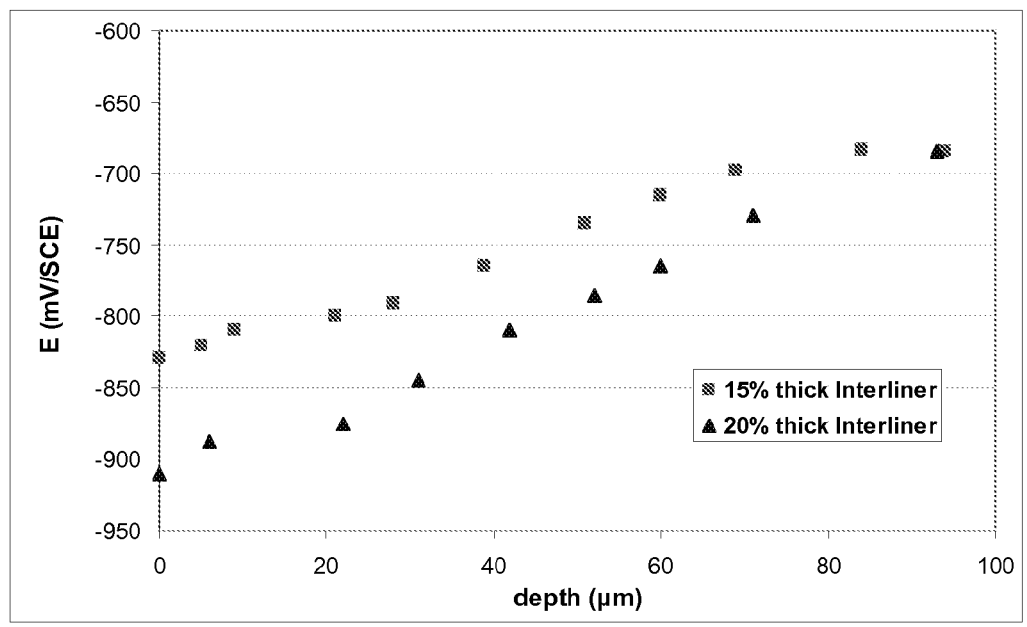
FIG. 3 shows corrosion potential profile for the materials given in example 3.

The corrosion potential profile was measured up to a depth of 0.08 mm (80 μm). The result is shown in FIG. 3. It can be concluded for this example that the difference in corrosion potential between core and interliner is about 190 mV, and between core and surface about 225 mV.

The results in FIG. 3 show the effect of an increasing thickness of the interliner.

The results shown in the different examples can be summarized as follows in TABLE 1.

TABLE 1

| % Zn in Interliner | Thickness of Interliner (μm) | Corrosion potential difference between core and Interliner (mV) | Corrosion potential difference between core and surface (mV) |
|---|---|---|---|
| 1.2 | 39 | 42 | 50 |
| 2.5 | 39 | 60 | 70 |
| 4.5 | 39 | 115 | 145 |
| 4.5 | 52 | 190 | 225 |

The invention claimed is:

1. A multi-layer brazing sheet comprising:
a core of a 3xxx alloy,
an inner braze cladding of a 4xxx alloy, and
between core and inner braze cladding an interliner comprising an interliner alloy selected from the group consisting of a 3xxx, 1xxx and 7xxx alloy, wherein the interliner has a lower level of Mn than the core, and
wherein the 3xxx alloy of the core comprises:
0.55-1.0 wt % Cu
0.65-1.8 wt % Mn
<0.3 wt % Mg
<0.4 wt % Zn
<1.0 wt % Si
<0.7 wt % Fe
and optionally one or more of
<0.3 wt % Cr
<0.02 wt % Ti,
and one or more of V, Zr, In, Sc, Sn, each in a range of up to 0.5%, balance aluminium and unavoidable impurities, and
wherein the interliner alloy comprises 0.1-5.0 wt % Zn, wherein if the interliner alloy is 3xxx then the 3xxx interliner alloy further comprises 0.5 to 1.5 wt % Mn.

2. The brazing sheet according to claim 1, wherein the interliner is made of 3xxx alloy comprising:
<0.25 wt % Cu
0.5-1.5 wt % Mn
<0.3 wt % Mg 0.1-5.0 wt % Zn
<1.0 wt % Si
<0.7 wt % Fe
balance aluminium and unavoidable impurities.

3. The brazing sheet according to claim 1, wherein the 3xxx alloy of the core comprises <0.5 wt % Fe.

4. The brazing sheet according to claim 1, wherein the 3xxx alloy of the core comprises 0.55-0.8 wt % Cu.

5. The brazing sheet according to claim 1, wherein the 3xxx alloy of the core comprises 0.65-1.5 wt % Mn.

6. The brazing sheet according to claim 1, wherein the 3xxx alloy of the core comprises 0.65-1.2 wt % Mn.

7. The brazing sheet according to claim 1, wherein the 3xxx alloy of the core comprises <0.1 wt % Mg.

8. The brazing sheet according to claim 1, wherein the 3xxx alloy of the core comprises <0.05 wt % Mg.

9. The brazing sheet according to claim 1, wherein the 3xxx alloy of the core comprises <0.15 wt % Cr.

10. The brazing sheet according to claim 1, wherein the interliner is made of 3xxx alloy comprising <0.7 wt % Si.

11. The brazing sheet according to claim 1, wherein the interliner is made of 3xxx alloy comprising <0.4 wt % Si.

12. The brazing sheet according to claim 1, wherein the interliner is made of 3xxx alloy comprising <0.5 wt % Fe.

13. The brazing sheet according to claim 1, wherein the interliner is made of 3xxx alloy comprising <0.2 wt % Cu.

14. The brazing sheet according to claim 1, wherein the interliner is made of 3xxx alloy comprising 0.5-1.0 wt % Mn.

15. The brazing sheet according to claim 1, wherein the interliner is made of 3xxx alloy comprising <0.1 wt % Mg.

16. The brazing sheet according to claim 1, wherein the interliner is made of 3xxx alloy comprising 0.5-3.0 wt % Zn.

17. The brazing sheet according to claim 1, wherein the interliner alloy is a 1xxx alloy with a Zn content in the range of 0.1-2.0 wt %.

18. The brazing sheet according to claim 1 wherein the brazing sheet further comprises an outer braze cladding.

19. The brazing sheet according to claim 18, wherein a further interliner is provided between the core and outer braze cladding.

20. The brazing sheet according to claim 18, wherein the inner and/or outer braze cladding is made of a 4xxx alloy with Si<15 wt %.

21. The brazing sheet according to claim 18, wherein the inner and/or outer braze cladding is made of a 4xxx alloy with Si 4-15 wt % and with Cu<0.3 wt %.

22. The brazing sheet according to claim 18, wherein successive layers of the brazing sheet with respect to the total thickness of the multi-layered brazing sheet have the following thickness ratio:

| | |
|---|---|
| outer braze cladding | 5-15% |
| core | 60-85% |
| interliner | 5-30% |
| inner braze cladding | 5-15%. |

23. The brazing sheet according to claim 1, wherein successive layers of the brazing sheet with respect to the total thickness of the multi-layered brazing sheet have the following thickness ratio:

| | |
|---|---|
| core | 60-85% |
| interliner | 5-30% |
| inner braze cladding | 5-15%. |

24. Brazed assembly comprising one or more tubes made from the multi-layered brazing sheet product according to claim 1.

25. The brazing sheet according to claim 1, wherein the interliner is of 1xxx alloy.

26. The brazing sheet according to claim 1, wherein the interliner is of 7xxx alloy.

27. The brazing sheet according to claim 1, wherein the interliner comprises 0.8-0.9 wt % Mn and 1.2 to 2.6 wt % Zn.

28. The brazing sheet according to claim 1, wherein the core comprises 0.65-0.95 wt % Mn and the interlayer has 0.03 wt % Ti.

29. The brazing sheet according to claim 1,
wherein the core comprises 0.88-0.95 wt % Mn;
wherein the interliner is made of 3xxx alloy consisting of:
  $\leq$0.02 wt % Cu
  0.8-0.9 wt % Mn
  $\leq$0.01 wt % Mg
  1.2-2.6 wt % Zn
  0.03 wt % Ti
  <0.4 wt % Si
  <5 wt % Fe
balance aluminium and unavoidable impurities.

* * * * *